United States Patent
Harda (10) Patent No.: US 9,056,615 B2
(45) Date of Patent: Jun. 16, 2015

(54) VEHICLE SYSTEM FOR CONTROL OF VEHICLE SAFETY PARAMETERS, A VEHICLE AND A METHOD FOR CONTROLLING SAFETY PARAMETERS

(71) Applicant: VOLVO CAR CORPORATION, Gothenburg (SE)

(72) Inventor: Peter Harda, Torslanda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/302,453

(22) Filed: Jun. 12, 2014

(65) Prior Publication Data

US 2015/0012185 A1 Jan. 8, 2015

(30) Foreign Application Priority Data

Jul. 3, 2013 (EP) ..................................... 13174857

(51) Int. Cl.
*B60W 30/00* (2006.01)
*B60W 30/08* (2012.01)
*B60W 30/085* (2012.01)
(Continued)

(52) U.S. Cl.
CPC ............ *B60W 30/08* (2013.01); *B60R 21/0132* (2013.01); *B60R 21/0134* (2013.01); *B60W 30/16* (2013.01); *B60W 2420/42* (2013.01); *B60W 2420/52* (2013.01); *B60W 2550/308* (2013.01); *B60W 2750/30* (2013.01); *B60W 2750/302* (2013.01); *B60W 2750/308* (2013.01)

(58) Field of Classification Search
CPC ..... B60W 30/00; B60W 30/14; B60W 30/16; B60W 30/095; B60W 30/09; B60W 30/085; B60W 2030/082; B60W 30/08; B60R 21/0134; G01S 13/93; G01S 13/931; G01S 2013/9342; G01S 2013/9346; G01S 2013/935
USPC .................. 701/36–49, 70–93, 96, 300–302; 340/901, 903, 904, 435–437
See application file for complete search history.

(56) References Cited

U.S. PATENT DOCUMENTS 6,571,176 B1 * 5/2003 Shinmura et al. ............. 701/301
6,580,385 B1 * 6/2003 Winner et al. ................. 342/70
(Continued)

FOREIGN PATENT DOCUMENTS

EP        1500562 A1    1/2005
EP        2068269 A2    6/2009

OTHER PUBLICATIONS

Extended European Search Report Dated Dec. 13, 2013, Application No. 1317485T6-1752, Applicant Volvo Car Corporation, 5 Pages.

*Primary Examiner* — Thomas Tarcza
*Assistant Examiner* — Tyler J Lee
(74) *Attorney, Agent, or Firm* — Brooks Kushman P.C.

(57) ABSTRACT

A vehicle, a method and a vehicle system for control of vehicle safety parameters is provided. The system is arranged to determine a closing velocity between a host vehicle exterior portion and an external object in a road environment where the host vehicle and the external object approach each other. The system comprises image capturing means, processing means and a sensor arrangement. The processing means are arranged to determine the closing velocity for each time instance by forming a quota of a distance between a first position and the host vehicle exterior portion and the estimated time to collision between the first position and the external object. The vehicle system is arranged to control the one or more vehicle safety parameters as a function of the determined closing velocity.

15 Claims, 3 Drawing Sheets

(51) Int. Cl.
    *B60W 30/09*     (2012.01)
    *B60W 30/095*     (2012.01)
    *B60R 21/0134*     (2006.01)
    *B60W 30/16*     (2012.01)
    *B60R 21/0132*     (2006.01)

(56) References Cited

U.S. PATENT DOCUMENTS

| | | | |
|---|---|---|---|
| 7,417,580 B2 * | 8/2008 | Abe et al. | 342/27 |
| 7,777,669 B2 * | 8/2010 | Tokoro et al. | 342/70 |
| 7,825,849 B2 * | 11/2010 | Tsuchida et al. | 342/70 |
| 8,125,372 B2 * | 2/2012 | Focke et al. | 342/70 |
| 8,452,055 B2 * | 5/2013 | Stein et al. | 382/104 |
| 8,581,776 B2 * | 11/2013 | Tsunekawa | 342/70 |
| 2005/0062615 A1 * | 3/2005 | Braeuchle et al. | 340/903 |
| 2006/0091654 A1 * | 5/2006 | De Mersseman et al. | 280/735 |
| 2006/0145463 A1 | 7/2006 | Isaji et al. | |
| 2006/0276964 A1 * | 12/2006 | Sano | 701/300 |
| 2007/0182528 A1 * | 8/2007 | Breed et al. | 340/435 |
| 2007/0228705 A1 | 10/2007 | Rao et al. | |
| 2008/0300788 A1 * | 12/2008 | Kanaboshi et al. | 701/301 |
| 2010/0085238 A1 | 4/2010 | Muller-Frahm et al. | |
| 2010/0305857 A1 * | 12/2010 | Byrne et al. | 701/301 |
| 2011/0238309 A1 * | 9/2011 | Tsunekawa | 701/301 |
| 2012/0239265 A1 * | 9/2012 | Kato et al. | 701/70 |
| 2012/0239266 A1 * | 9/2012 | Kato et al. | 701/70 |
| 2013/0024075 A1 | 1/2013 | Zagorski et al. | |
| 2014/0163859 A1 * | 6/2014 | Tsuchida | 701/301 |
| 2014/0297171 A1 * | 10/2014 | Minemura et al. | 701/301 |

\* cited by examiner

VEHICLE SYSTEM FOR CONTROL OF VEHICLE SAFETY PARAMETERS, A VEHICLE AND A METHOD FOR CONTROLLING SAFETY PARAMETERS

CROSS-REFERENCE TO RELATED APPLICATIONS

This application claims foreign priority benefits under 35 U.S.C. §119(a)-(d) to European patent application number EP 13174857.6, filed Jul. 3, 2013, which is incorporated by reference in its entirety.

TECHNICAL FIELD

Embodiments herein relate to a vehicle system for control of vehicle safety parameters. Embodiments herein further relate to a vehicle comprising a vehicle system for control of vehicle safety parameters and to a method for controlling vehicle safety parameters.

BACKGROUND

Some vehicles today are equipped with predictive safety systems or adaptive cruise control systems. Such systems may monitor the vehicle surroundings and determine a position for another vehicle near a vehicle equipped with such a system. Such a system may calculate whether there will be a collision between the vehicle and the other vehicle, and in such case warn a driver of the vehicle.

Some safety systems may calculate a time until a possible collision between a host vehicle and another vehicle. If a collision is expected, emergency braking may be activated for preventing the collision.

In US2010085238A1, is described a driver assistance system with two object position-finding systems. One first object position-finding system is formed by a radar sensor, and is determined by analysis of radar signals. A second object position-finding system includes a monocular position data for one or more located object video system, with a front mounted video camera facing forward and an image processing module. A first module is arranged to calculate a first time to collision based on data from the radar sensor, and a second module is arranged to calculate a second time to collision based on input from the video camera. The two different times to collisions are then compared. If correspondence between the first time to collision and the second time to collision is found, an increased certainty that the located object is a real object is gained.

EP1500562B2 relates to a collision protection apparatus of a vehicle, comprising a camera unit, a bumper sensor and a radar unit. A relative speed to an object is calculated based on an output from the radar unit. During a collision, which is detected by the bumper sensor, input from the camera unit is used to calculate coordinates of the object.

In some situations it may be advantageous to use information collected by both a radar system and a front facing camera, for example, information collected by one system can be verified or compared to information collected by a different system. However, such a system requires many different components which have to cooperate in an intended manner, and such a system may therefore be both expensive, complex and heavy. Thus, improvements in the field of vehicle safety parameter control, by the use of a determined closing velocity, are still desirable.

SUMMARY

Embodiments herein aim to provide a vehicle system for control of vehicle safety parameters eliminating or at least reducing the problems and/or drawbacks associated with prior art solutions.

According to an embodiment, this is provided by a vehicle system for control of vehicle safety parameters, the system being arranged to determine a closing velocity between a host vehicle exterior portion and an external object, or a part thereof, in a road environment where the host vehicle and the external object approaches each other, the system comprising, image capturing means arranged at a first position of the host vehicle, the image capturing means being arranged to detect a field of view in a first direction and an extension of the external object, or a part thereof, in the field of view, processing means arranged to estimate a time to collision between the first position and the external object, or the part thereof, from a change of ratio, received from the image capturing means, between the field of view and the extension of the external object, or the part thereof, a sensor arrangement arranged to detect a collision between the host vehicle exterior portion and the external object, wherein the processing means further are arranged to determine a closing velocity between the host vehicle exterior portion and the external object, or a part thereof, for each time instance by dividing a distance between the first position and the host vehicle exterior portion with the estimated time to collision between the first position and the external object, or the part thereof, and the vehicle system being arranged to control one or more vehicle safety parameters as a function of a determined closing velocity.

Since the closing velocity is determined as a quota of a distance between the first position and the host vehicle exterior portion and the estimated time to collision, one or more vehicle safety parameters can be controlled by the vehicle system as a function of the determined closing velocity.

The distance between the first position and the host vehicle exterior portion is a known distance, e.g., between a front facing camera arranged in an upper part of a vehicle windshield and a front portion of a front bumper. Since the closing velocity is determined based on input from the image capturing means and the distance between the first position and the host vehicle exterior portion, no additional system, such as a radar system, is needed during the determination of the closing velocity.

Due to the use of a determined closing velocity and the known distance between the first position and the host vehicle exterior portion, various safety parameters can be controlled with input from a single monovision camera. When an approaching object is detected, the vehicle system can continuously determine a closing velocity for a collision between the exterior portion of the host vehicle and the external object, assuming that the collision occurs at the moment of the determination. The accuracy of the determined closing velocity increases when the distance between the host vehicle and the external object decreases. Thanks to the continuous determination of the closing velocity, the control of the vehicle safety parameters can be performed continuously, such that the safety parameters are in a desired state when a collision is imminent.

Thus, hereby is provided vehicle system for control of vehicle safety parameters, eliminating or at least reducing the problems and/or drawbacks associated with prior art solutions.

According to some embodiments, processing means are arranged to use a closing velocity between the host vehicle exterior portion and the external object, or a part thereof, determined within a predefined time from a, by the sensor arrangement, detected collision between the host vehicle exterior portion and the external object, or a part thereof, for control of the one or more safety parameters.

Since a closing velocity, determined within a predefined time from a detected collision, is used for control of the one or more safety parameters, the closing velocity can be determined with high accuracy.

The distance between the first position of the host vehicle and the host vehicle exterior portion is constant before a collision, and the first position of the host vehicle and the host vehicle exterior portion thus approaches the external object with the same velocity.

The distance between the first position of the host vehicle and the external object is converging with the distance between the first position and the host vehicle exterior portion, until contact occurs between the host vehicle exterior portion and the external object. Due to this, the accuracy of the determined closing velocity increases when the predefined time from a detected collision between the host vehicle exterior portion and the external object decreases.

According to some embodiments, processing means are arranged to use a closing velocity between the host vehicle exterior portion and the external object, or a part thereof, determined within a predefined time before a, by the sensor arrangement, detected collision between the host vehicle exterior portion and the external object, or a part thereof, for control of the one or more safety parameters.

Since a closing velocity, determined within a predefined time before a detected collision between the host vehicle exterior portion and the external object, or a part thereof, is used for control of the one or more safety parameters, the determined closing velocity is very accurate. The accuracy of the determined closing velocity increases when the predefined time before a detected collision between the host vehicle exterior portion and the external object decreases. The use of a closing velocity determined within a predefined time before a detected collision implies that safety parameters can be controlled to be in a desired state before the collision begins. Due to this, performance requirements put on the processing means may be lower than otherwise.

According to some embodiments, processing means are arranged to use a closing velocity between the host vehicle exterior portion and the external object determined immediately after a, by the sensor arrangement, detected collision between the host vehicle exterior portion and the external object for control of the one or more vehicle safety parameters.

When the sensor arrangement detects the collision, the distance between the first position and the external object is confirmed, since the distance then is substantially equal to the distance between the first position and the host vehicle exterior portion. Thus, since a closing velocity determined immediately after a detected collision between the host vehicle exterior portion and the external object, or a part thereof, is used for control of the one or more safety parameters, the determined closing velocity is very accurate.

According to some embodiments, the sensor arrangement comprises at least one of an accelerometer, a sensor arranged to detect direct pressure and a sensor arranged to detect pressure change in a tube or cavity. Since the sensor arrangement comprises at least one of an accelerometer, a sensor arranged to detect direct pressure and a sensor arranged to detect pressure change in a tube or cavity, a collision can be detected in a fast and accurate manner.

According to some embodiments, the processing means are arranged to compensate a signal from a sensor in the sensor arrangement based on at least one of a sensor position, a sensor type, a signal velocity and a signal characteristic.

Since the processing means are arranged to compensate a signal from a sensor in the sensor arrangement, based on at least one of a sensor position, a sensor type, a signal velocity and a signal characteristic, different positions, different sensors types and different kind of signalling can be used.

According to some embodiments, at least one of the processing means and the image capturing means comprise object recognition software, allowing the image capturing means to detect any visible parts, details, or contours of the external object.

Since at least one of the processing means and the image capturing means comprise object recognition software, allowing the image capturing means to detect any visible parts, details, or contours of the external object, the closing velocity can be determined with high accuracy.

In addition, since any visible parts, details, or contours of the external object can be used for the estimation of the time to collision, the time to collision can be estimated also when only some parts, details or contours of the external object are visible. Thus, any visible length and/or area can be used in order to estimate the time to collision.

According to some embodiments, at least one of the processing means and the image capturing means comprise object recognition software, allowing the image capturing means to detect any spatial relation or change of spatial relation between visible parts, details, or contours of the external object.

Since at least one of the processing means and the image capturing means comprise object recognition software, any spatial relation or change of spatial relation between visible parts, details, or contours of the external object, can be used for the estimation of the time to collision.

According to some embodiments, an image analysis of the field of view is restricted to a horizontal portion of the field of view, the restriction being based on an estimated distance between the host vehicle and the external object.

Since an image analysis of the field of view is restricted to a horizontal portion of the field of view based on an estimated distance between the host vehicle and the external object, image analysis is only necessary for a portion of the field of view around the external object. Hereby the image analysis can be performed faster. In addition, there is less risk that a time to collision with non-relevant external objects and/or non-relevant parts of external objects are estimated.

According to some embodiments, the system is arranged to control at least one of an occupant restraint system parameter such as an airbag-related parameter and/or a safety belt related parameter.

Since the system is arranged to control at least one of an occupant restraint system parameter such as an airbag-related parameter and/or a safety belt related parameter, a vehicle occupant can be well protected in a collision scenario. Hereby an airbag can be deployed differently, and/or a safety belt/seat belt can be tightened differently for different determined closing velocities.

Thus, hereby is provided a vehicle system for control of vehicle safety parameters eliminating or at least reducing the problems and/or drawbacks described above.

Embodiments herein also aim to provide a vehicle comprising a vehicle system for control of vehicle safety parameters without the problems or drawbacks described above.

According to some embodiments, this is provided by a vehicle comprising a vehicle system for control of vehicle safety parameters according to embodiments disclosed herein. Hereby vehicle safety parameters can be controlled based on a determined closing velocity.

Embodiments herein also aim to provide a method for controlling vehicle safety parameters without the problems or drawbacks described above.

According to some embodiments, this is provided by a method for controlling vehicle safety parameters, the method comprises; detecting a field of view in a first direction and an extension of an external object, or a part thereof, in a direction substantially perpendicular to the first direction, the external object, or the part thereof, being within the field of view, estimating a time to collision between image capturing means in a first position of the host vehicle and the external object, or the part thereof, from of a change of ratio, between the field of view and the extension of the external object, or the part thereof, over a predefined time period, determining a closing velocity between the host vehicle exterior portion and the external object, or a part thereof, for each time instance by dividing a distance between the first position and the host vehicle exterior portion with the estimated time to collision between the first position and the external object, or the part thereof and controlling one or more vehicle safety parameters as a function of the determined closing velocity.

Since a closing velocity between the host vehicle exterior portion and the external object, is determined as a quota of a distance between the first position and the host vehicle exterior portion and the estimated time to collision, one or more vehicle safety parameters can be controlled as a function of the determined closing velocity.

According to some embodiments, this is provided by a method for controlling vehicle safety parameters wherein the method further comprises; using a closing velocity between the host vehicle exterior portion and the external object, or a part thereof, determined within a predefined time from a detected collision between the host vehicle exterior portion and the external object for controlling of the one or more safety parameters.

Since a closing velocity determined within a predefined time from a detected collision between the host vehicle exterior portion and the external object for controlling of the one or more safety parameters is used, the closing velocity can be determined with high accuracy.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

The various aspects of embodiments herein, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
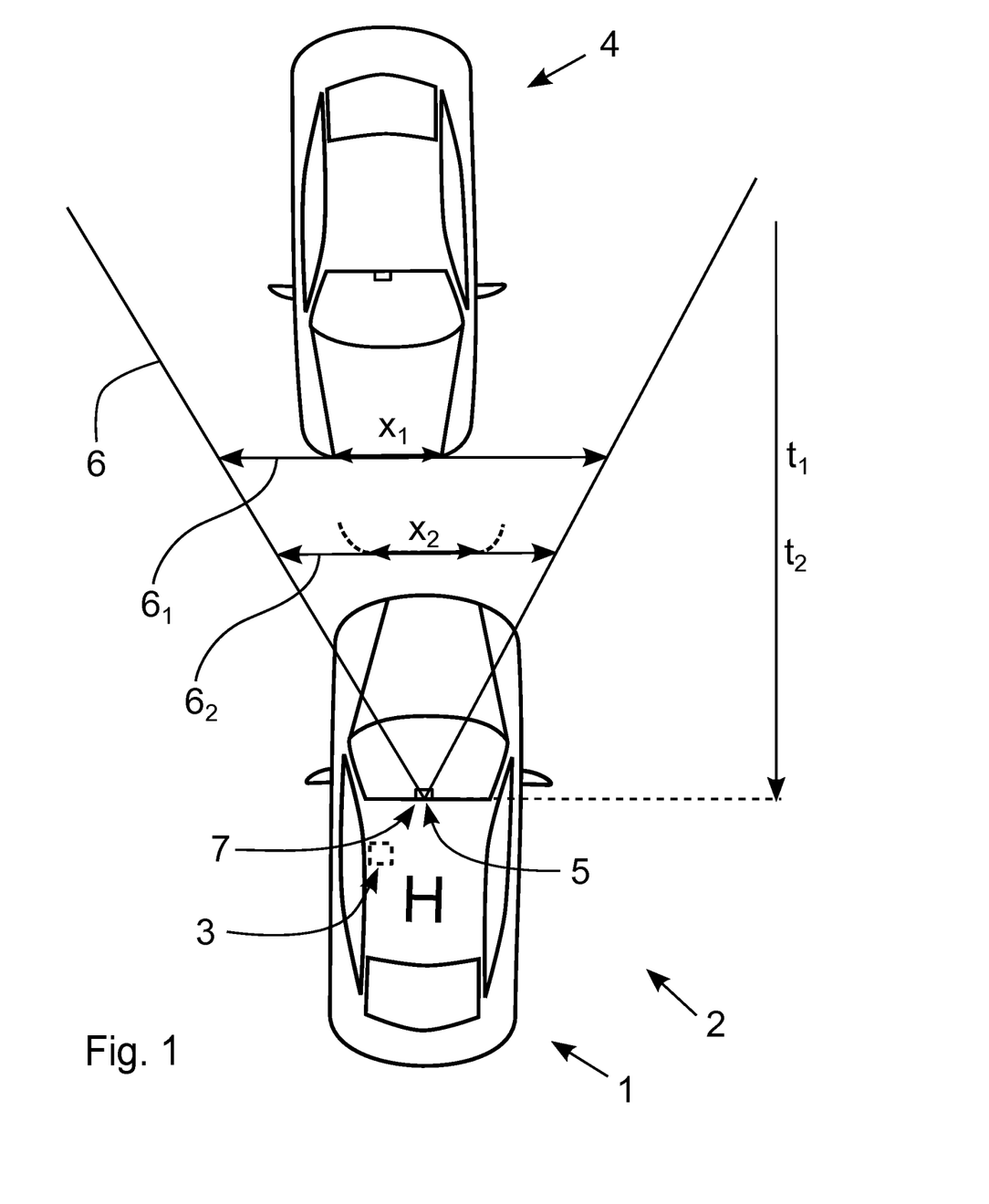
FIG. 1 illustrates a vehicle and a vehicle system for control of vehicle safety parameters according to some embodiments.

FIG. 1 illustrates a host vehicle 1 comprising a vehicle system 2 for control of vehicle safety parameters 3, and an external object 4 in the form of another vehicle. The host vehicle 1 and the external object 4 are approaching each other with a closing velocity in a road environment.

The closing velocity between two vehicles is the relative velocity between the vehicles when they are approaching each other. The host vehicle 1 may have a relatively low closing velocity to a vehicle ahead of the host vehicle 1, which a host vehicle driver intends to overtake. The host vehicle 1 may also have a relatively high closing velocity to an oncoming vehicle in an opposing lane.

The host vehicle 1 and the external object 4 are approaching each other when they are driving towards each other, e.g., in opposing lanes or in the same lane on a road. They can also approach each other in a situation where they are driving along a road in the same direction but with different velocities, or when trajectories, along which the vehicles drive, intersect.

Image capturing means 5 are arranged to detect a field of view 6 in a first direction. According to the embodiment illustrated in FIG. 1, the first direction is ahead of the host vehicle 1, facing substantially in a longitudinal direction of the host vehicle 1. In other embodiments, the first direction is facing rearwards or in a non-longitudinal direction of the host vehicle 1. The image capturing means 5 can be arranged to cover different directions from the host vehicle 1, such that a part of, or the entire, host vehicle surrounding is monitored. Both moving objects, such as vehicles, pedestrians and animals, and non-moving objects, such as obstacles, can be captured in the field of view 6.

The image capturing means 5 may be any image capturing means capable to detect an extension of an external object. The image capturing means can be a camera arranged to detect objects in visible light, IR-light, UV-light, or arranged to detect an extension of an external object using heat radiation from the external object. According to FIG. 1, the image capturing means 5 is a monovision camera arranged in a first position 7 in an upper part of a host vehicle windshield. In other embodiments the image capturing means 5 are arranged in other positions, from where detection of the surroundings is possible, e.g., in a rear- or side window, or in a grille.

In FIG. 1 is illustrated a field of view 6 in a first direction ahead of the host vehicle 1. The field of view 6 covers a road, along which the host vehicle 1 drives, and a road environment at sides of the road.

In FIG. 1 is illustrated a scenario where the host vehicle 1 and an external object 4 are driving towards each other. The host vehicle 1 is equipped with a vehicle system 2 for control of vehicle safety parameters 3. The external object 4 is captured in the field of view 6.

At a first time instance $t_1$, an extension of the external object 4, or a part thereof, covers a first share x1 of the field of view $6_1$, when captured by the image capturing means 5 which are arranged at the first position 7. At a second time instance $t_2$, an extension of the external object 4, or a part thereof, illustrated with dashed lines, covers a second share $x_2$ of the field of view $6_2$, when captured by the image capturing means 5 which are arranged at the first position 7. According to the FIG. 1 illustration, an extension of a grille or a license plate in the vicinity of a front bumper of the external object 4 is detected.

When the host vehicle 1 and the external object 4 move relative each other, a ratio between an extension of the field of view 6 and the share x of the external object 4 in the field of view 6 changes. The share x of the field of view covered by the external object 4, or a part thereof, increases when the host vehicle 1 and the external object 4 approach each other.

A time to impact TTI, i.e., a remaining time until an expected collision occurs between the first position 7 of the host vehicle 1 and the external object 4, provided that no acceleration or deceleration occurs, can be estimated using the equation;

$$TTI = \frac{t_2 - t_1}{\frac{x_2}{x_1} - 1} \quad (8)$$

Since the image capturing means 5 continuously capture the external object 4 and parts thereof, information relating to the share x of the field of view 6 covered by the external object 4, or a part thereof, is continuously updated.

In FIG. 1 it is illustrated that a width of a front part of the external object 4 is used for the estimation of TTI. According to other embodiments, any other visible extension of the external object 4 or a part thereof may be used, such as a width, length, height and/or area of a windshield, window, license plate, headlight, grille, rear-view mirror and the like. Furthermore, any spatial relation or change of spatial relation between visible parts, details, or contours of the external object 4 may be used.

Figure 2:
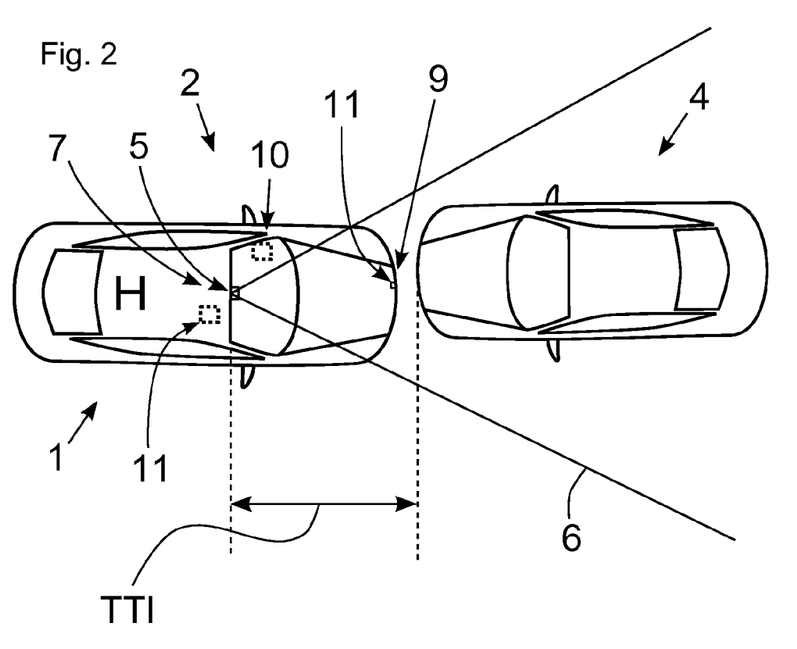
FIG. 2 illustrates a vehicle and a vehicle system for control of vehicle safety parameters according to some alternative embodiments.

FIG. 2 illustrates a scenario where the host vehicle 1 and an external object 4 are driving towards each other. The host vehicle 1 is equipped with a vehicle system 2 for control of vehicle safety parameters 3. An occupant restraint system parameter, such as an airbag-related parameter and/or a safety belt related parameter, can be controlled by the vehicle system 3. Other vehicle safety systems, such as a pedestrian protecting system, a rollover protection system, a steering system and/or a braking system, may also be controlled.

The vehicle system 2 is arranged to determine a closing velocity between a host vehicle exterior portion 9 and the external object 4, or a part thereof, in the road environment when the host vehicle 1 and the external object 4 are approaching each other. According to the FIG. 2 illustration, the exterior portion 9 is a front bumper skin. In other embodiments an exterior portion is a rear bumper, a side of the host vehicle 1 and/or a corner of the host vehicle 1.

The vehicle system 2 comprises image capturing means 5 arranged at a first position 7 of the host vehicle 1. The image capturing means 5 are arranged to detect a field of view 6 in a first direction ahead of the host vehicle 1, and an extension of the external object, or a part thereof, in the field of view 6.

The vehicle system 2 also comprises processing means 10. The processing means 10 and/or the image capturing means 5 comprise object recognition software, such that any visible parts, details, or contours of the external object 4 can be detected through an image analysis.

According to some embodiments, the image analysis of the field of view 6 is restricted to a horizontal portion of the field of view 6. The restriction is based on an estimated distance between the host vehicle 1 and the external object 4. The estimation can be based on input from the image capturing means 5, e.g., through arranging a field of view to be monitored that only will capture objects below a predefined height above road level within a short distance, such as 0-5 meters, from the host vehicle exterior portion. Hereby e.g., a bumper of an external object in the form of another vehicle can be captured and the capturing of non-relevant objects, such as a windscreen of another vehicle, can be avoided. Alternatively, the estimated distance may be received from another vehicle system, such as a radar or lidar system.

The processing means 10 are arranged to estimate a time to collision TTI between the first position 7 and the external object 4, or the part thereof, from a change of ratio between the field of view 6 and the extension x of the external object 4, or the part thereof.

The processing means 10 may comprise one or more processing units. A processing unit may be a central processing unit, CPU, also referred to as a central processor unit. A CPU is hardware within a computer that carries out instructions of a computer program/software when this is executed by performing basic arithmetical, logical, and input/output operations. The processing means 10 may also comprise an accelerated processing unit, APU, also referred to as an advanced processing unit. An APU is a processing unit that includes additional processing capability designed to accelerate one or more types of computations outside of a CPU. The processing means 10 may also comprise an application programming interface, API, which specifies how software components may interact with each other.

The processing means 10 comprises one or more processors with associated software and one or more memory units in communication with the one or more processors. The processing means 10, upon execution of the associated software on the one or more processors, can estimate the time to collision TTI by using the equation 8 above.

The vehicle system 2 further comprises a sensor arrangement 11 arranged to detect a collision between the host vehicle exterior portion 9 and the external object 4. The sensor arrangement 11 may comprise one or more types of sensors, and the sensors can be mounted in different parts of the host vehicle 1.

The sensor arrangement 11 comprises at least one of an accelerometer, a sensor arranged to detect direct pressure and a sensor arranged to detect pressure change in a tube or cavity. An accelerometer can for example be mounted between front seats of the host vehicle 1. A sensor arranged to detect direct pressure and/or a sensor arranged to detect pressure change in a tube or cavity can for example be arranged under a bumper skin.

The processing means 10 are arranged to determine a closing velocity between the host vehicle exterior portion 9 and the external object 4, or a part thereof, for each time instance. With "each time instance" means repeatedly as often as needed, e.g., 1-100 times per second.

The closing velocity is determined by forming a quota of a distance between the first position 7 and the host vehicle exterior portion 9 and the estimated time to collision TTI between the first position 7 and the external object 4, or the part thereof. The vehicle system 2 is then arranged to control the one or more vehicle safety parameters 3 as a function of a determined closing velocity.

Figure 3:
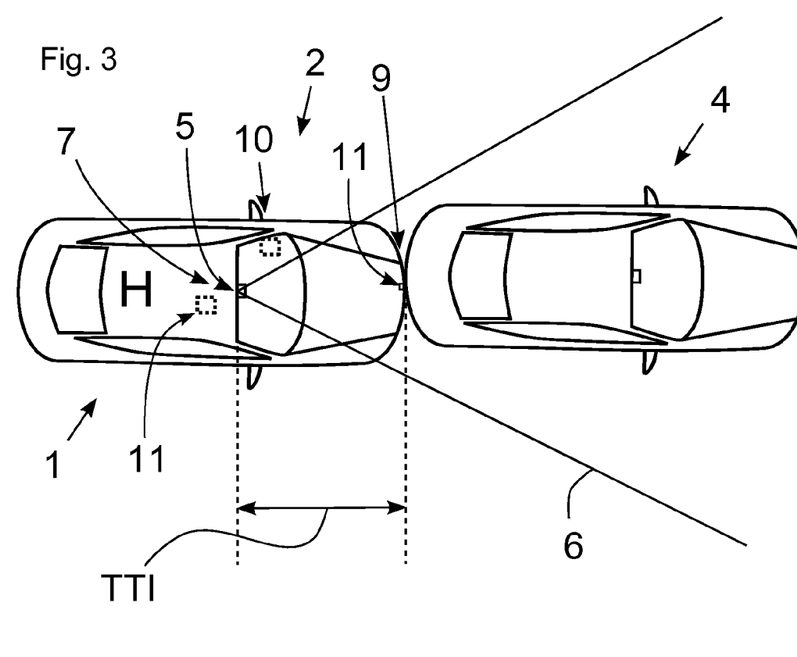
FIG. 3 illustrates a vehicle and a vehicle system for control of vehicle safety parameters according to yet some further embodiments.

In FIG. 3 is illustrated a collision scenario between the host vehicle 1 and an external object 4 in the form of another vehicle. In this embodiment the host vehicle 1 and the external object 4 are moving in substantially the same direction. A velocity of the host vehicle 1 is larger than the velocity of the external object 4, and the host vehicle 1 approaches the external object 4 from behind until a collision occurs. The collision is detected by the host vehicle sensor arrangement 11.

The processing means 10 are arranged to use a closing velocity between the host vehicle exterior portion 9 and the external object 4, determined within a predefined time from a detected collision, for the control of the one or more safety parameters 3. A predefined time may be any value between a microsecond and a second, such as 10 milliseconds. A closing velocity determined within a predefined time before or immediately after a detected collision can be used for the control of the safety parameters 3.

The vehicle ahead of the host vehicle 1 may also be equipped with a vehicle system for control of vehicle safety parameters. Image capturing means may for example be arranged in an upper part of the rear window, directed rearwards. The host vehicle 1 approaching from behind can then be captured in the field of view, such that e.g., airbags and seatbelts can be controlled based on the determined closing velocity. A distance between the image capturing means and a rear bumper skin may then be used for the determination.

A signal from a sensor in the sensor arrangement 11 to the processing means 10 may be compensated or modified based on at least one of a sensor position, a sensor type, a signal velocity and a signal characteristic. Hereby the processing means 10 may receive an accurate signal independently of the sensor type, sensor position and the location of the collision.

Figure 4:
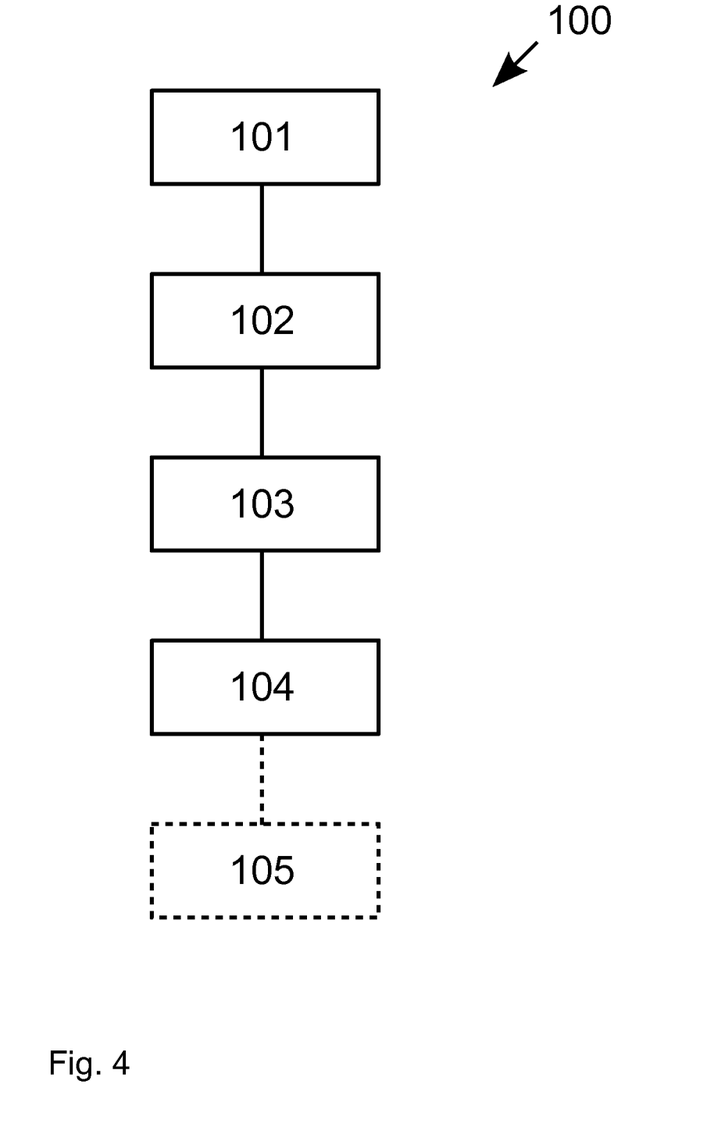
FIG. 4 illustrates a method for controlling vehicle safety parameters.

FIG. 4 illustrates a method 100 for controlling vehicle safety parameters. The method comprises:

Detecting 101 a field of view in a first direction and an extension of an external object, or a part thereof, in the field of view.

Estimating 102 a time to collision between image capturing means in a first position of the host vehicle and the external object, or the part thereof, from of a change of ratio, between the field of view and the extension of the external object, or the part thereof.

Determining 103 a closing velocity between the host vehicle exterior portion and the external object, or a part thereof, for each time instance by forming a quota of a distance between the first position and the host vehicle exterior portion and the estimated time to collision between the first position and the external object, or the part thereof.

Controlling 104 one or more vehicle safety parameters as a function of the determined closing velocity.

According to some embodiments, illustrated with dashed lines, the method further comprises:

Using 105 a closing velocity between the host vehicle exterior portion and the external object, or a part thereof, determined within a predefined time from a detected collision between the host vehicle exterior portion and the external object for controlling of the one or more safety parameters.

Although the aspects have been described with reference to example embodiments, many different alterations, modifications and the like will become apparent for those skilled in the art. Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

What is claimed is:

1. A vehicle system for control of vehicle safety parameters, the system being arranged to determine a closing velocity between a host vehicle exterior portion and an external object, or a part thereof, in a road environment where the host vehicle and the external object approach each other, the system comprising:

image capturing means arranged at a first position of the host vehicle, the image capturing means being arranged to detect a field of view in a first direction and an extension of the external object, or a part thereof, in the field of view;

processing means arranged to estimate a time to collision between the first position and the external object, or the part thereof, from a change of ratio between the field of view and the extension of the external object, or the part thereof; and a sensor arrangement arranged to detect a collision between the host vehicle exterior portion and the external object;

wherein the processing means further are arranged to determine a closing velocity between the host vehicle exterior portion and the external object, or the part thereof, for each of a plurality of time instances by dividing a distance between the first position and the host vehicle exterior portion by the estimated time to collision between the first position and the external object, or the part thereof, and the vehicle system is arranged to control one or more vehicle safety parameters as a function of the determined closing velocity.

2. The vehicle system according to claim 1 wherein the processing means are arranged to use a closing velocity between the host vehicle exterior portion and the external object, or a part thereof, determined within a predefined time from a collision detected by the sensor arrangement between the host vehicle exterior portion and the external object, or a part thereof, for control of the one or more safety parameters.

3. The vehicle system according to claim 1 wherein the processing means are arranged to use a closing velocity between the host vehicle exterior portion and the external object, or a part thereof, determined within a predefined time before a collision detected by the sensor arrangement between the host vehicle exterior portion and the external object, or a part thereof, for control of the one or more safety parameters.

4. The vehicle system according to claim 1 wherein the processing means are arranged to use a closing velocity between the host vehicle exterior portion and the external object determined immediately after a collision detected by the sensor arrangement between the host vehicle exterior portion and the external object for control of the one or more vehicle safety parameters.

5. The vehicle system according to claim 1 wherein the sensor arrangement comprises at least one of an accelerometer, a sensor arranged to detect direct pressure and a sensor arranged to detect pressure change in a tube or cavity.

6. The vehicle system according to claim 1 wherein the processing means are arranged to compensate a signal from a sensor in the sensor arrangement based on at least one of a sensor position, a sensor type, a signal velocity and a signal characteristic.

7. The vehicle system according to claim 1 wherein at least one of the processing means and the image capturing means comprise object recognition software for allowing the image capturing means to detect visible parts, details, or contours of the external object.

8. The vehicle system according to claim 1 wherein at least one of the processing means and the image capturing means comprise object recognition software for allowing the image capturing means to detect a spatial relation or change of spatial relation between visible parts, details, or contours of the external object.

9. The vehicle system according to claim 1 wherein the vehicle system is configured such that an image analysis of the field of view is restricted to a horizontal portion of the field of view, the restriction being based on an estimated distance between the host vehicle and the external object.

10. The vehicle system according to claim 1 wherein the vehicle system is arranged to control at least one occupant restraint system parameter.

11. The vehicle system according to claim 1 wherein the vehicle system is arranged to control an airbag-related parameter and/or a safety belt related parameter.

12. A vehicle comprising the vehicle system for control of vehicle safety parameters according to claim 1.

13. A method for controlling vehicle safety parameters, the method comprising:
  detecting a field of view in a first direction and an extension of an external object, or a part thereof, in the field of view;
  estimating a time to collision between image capturing means in a first position of a host vehicle and the external object, or a part thereof, from a change of ratio between the field of view and the extension of the external object, or the part thereof;
  determining a closing velocity between the host vehicle exterior portion and the external object, or the part thereof, for each time instance by dividing a distance between the first position and the host vehicle exterior portion by the estimated time to collision between the first position and the external object, or the part thereof; and
  controlling one or more vehicle safety parameters as a function of the determined closing velocity.

14. The method for controlling vehicle safety parameters according to claim 13 comprising using a closing velocity between the host vehicle exterior portion and the external object, or the part thereof, determined within a predefined time from a detected collision between the host vehicle exterior portion and the external object for controlling of the one or more safety parameters.

15. A vehicle system for control of vehicle safety parameters, the system being arranged to determine a closing velocity between a host vehicle exterior portion and an external object, or a part thereof, in a road environment where the host vehicle and the external object approach each other, the system comprising:
  a camera arranged at a first position of the host vehicle, the camera being arranged to detect a field of view in a first direction and an extension of the external object, or a part thereof, in the field of view; and
  one or more processors arranged to estimate a time to collision between the first position and the external object, or the part thereof, from a change of ratio between the field of view and the extension of the external object, or the part thereof;
  wherein the one or more processors are further arranged to determine a closing velocity between the host vehicle exterior portion and the external object, or the part thereof, for each of a plurality of time instances by dividing a distance between the first position and the host vehicle exterior portion by the estimated time to collision between the first position and the external object, or the part thereof, and the vehicle system is arranged to control one or more vehicle safety parameters as a function of the determined closing velocity.

* * * * *